United States Patent [19]

Tyson et al.

[11] 4,206,966
[45] Jun. 10, 1980

[54] PROJECTION MICROSCOPE WITH FILM HOLDER

[75] Inventors: Donald R. Tyson, North Hollywood; Robert W. Yates, Woodland Hills, both of Calif.

[73] Assignee: Redken Laboratories, Inc., Canoga Park, Calif.

[21] Appl. No.: 953,478

[22] Filed: Oct. 23, 1978

[51] Int. Cl.$^2$ .................... G02B 21/36; G02B 21/12; G03B 17/54; G03B 21/08
[52] U.S. Cl. .......................................... 350/19; 350/87; 350/91; 353/39; 353/64; 354/79; 354/77
[58] Field of Search ................... 350/9, 19, 34, 48, 49, 350/50, 51, 87, 90, 91; 353/39, 79, 97, 64, 63; 355/45; 354/77, 79

[56] References Cited

U.S. PATENT DOCUMENTS

| 3,183,768 | 5/1965 | Rosenburgh et al. ................. 355/45 |
| 3,354,775 | 11/1967 | Erban ..................................... 350/91 |
| 3,900,252 | 8/1975 | Disalvo et al. ......................... 350/9 |
| 4,056,318 | 11/1977 | Watanabe ............................... 355/45 |

FOREIGN PATENT DOCUMENTS

| 147911 | 7/1936 | Fed. Rep. of Germany ............. 353/39 |
| 855915 | 9/1952 | Fed. Rep. of Germany ............. 350/87 |

Primary Examiner—Jon W. Henry
Attorney, Agent, or Firm—Christie, Parker & Hale

[57] ABSTRACT

A projection microscope is provided in which light from a light source in the base of the microscope may be directed either up through a specimen mounted on a stage to provide transmitted lighting or obliquely downwardly onto the specimen to provide surface lighting. An objective lens above the illuminated area enlarges the image and focuses it on a projection lens mounted within a fully enclosed housing. Light from the projection lens is reflected by an adjustable mirror either onto the back of a ground glass viewing screen along a first optical axis, or onto a photographic film in a film holder positioned at the top of the housing.

5 Claims, 2 Drawing Figures

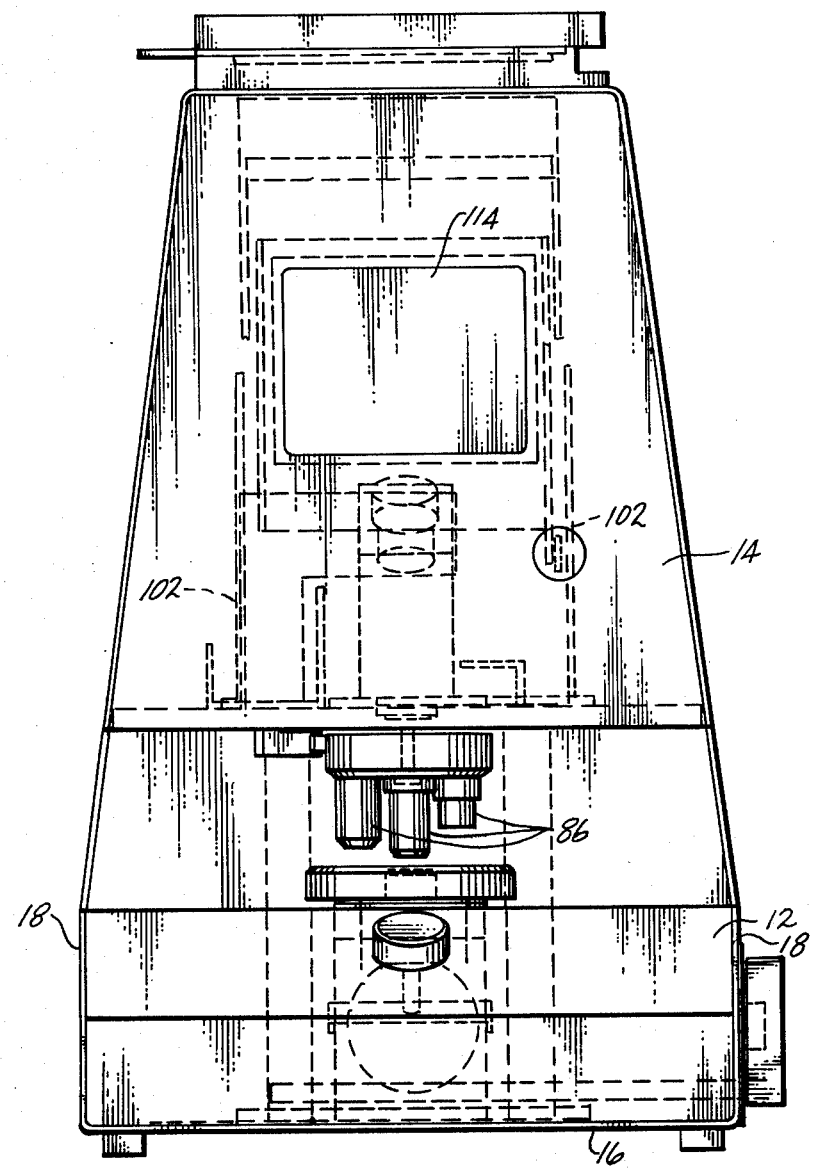

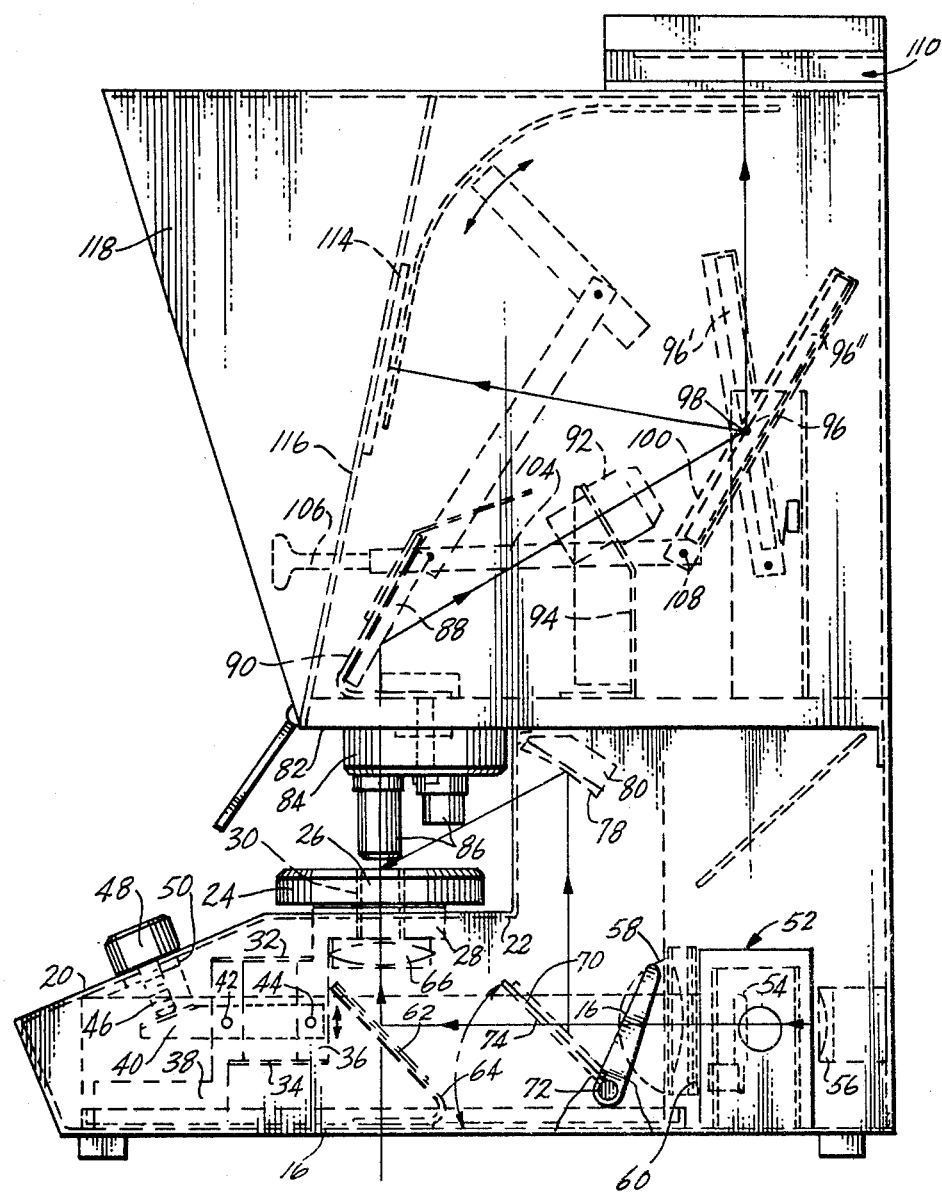

PROJECTION MICROSCOPE WITH FILM HOLDER

FIELD OF THE INVENTION

This invention relates to optical microscopes, and more particularly, is concerned with a projection microscope which forms an image on a viewing screen or alternatively on a photographic film.

BACKGROUND OF THE INVENTION

In U.S. Pat. No. 3,900,252 there is described a projection microscope for analyzing the quality of human hair. The microscope provides a tool for determining the condition of hair by examining the birefringence of the hair specimen using polarized light. The present invention is an improvement on the projection microscope described in the above-identified patent in that it provides a permanently mounted viewing screen for direct observation of the image of the magnified hair samples. At the same time the present invention permits photographing of the image to retain a permanent record. Both transmitted lighting and oblique lighting between 20° and 42° to the sample from a self-contained illuminating source is also provided.

SUMMARY OF THE INVENTION

In brief, the present invention provides a microscope having a housing including a base section and an upper viewing section. A specimen stage is mounted on the base section and an objective lens is mounted above the stage in the upper housing section. A light source mounted in the base section is directed by a first mirror along a first path extending through an opening in the stage along the optical axis of the objective lens. A second movable mirror directs light from the source along a second path extending upward onto another mirror, then downward obliquely to the top of the stage.

Mounted within the upper section, which is completely light-tight, is a projection lens permanently positioned to receive the image from the objective lens. The light from the projection lens is directed by a pivoted mirror mounted within the upper section along first or second optical paths. The first optical path is directed towards an opaque viewing screen mounted in the front wall of the housing. The second path is directed to a photographic film holder mounted on top of the housing.

DESCRIPTION OF THE DRAWINGS

For a better understanding of the invention reference should be made to the accompanying drawings, wherein:

FIG. 1 is a front elevational view of the projection microscope of the present invention; and FIG. 2 is a sectional view taken substantially on the line 2—2 of FIG. 1.

DETAILED DESCRIPTION

Referring to the drawings in detail, the numeral 10 indicates generally the outer housing which fully encloses the optics of the microscope. The outer housing is constructed of sheet metal and/or sheet plastic material over a suitable framework. The housing comprises a lower base section 12 and an upper viewing section 14.

A front cover 20 includes a horizontal section 22 above which is mounted a rotary specimen stage 24.

The stage 24 has a central opening 26 through which light passes to illuminate a specimen slide when mounted on the top of the stage. The stage is supported on a supporting block 28 by a suitable bushing 30 which allows the stage to be rotated 360 degrees about the vertical axis of the opening 26. The supporting block 28 is made vertically adjustable by a parallelogram supporting arrangement including a pair of flat parallel springs 32 and 34 secured at one end to the block 28 through a supporting member 36. The other ends of the springs 32 and 34 are secured to a supporting bracket 38 secured to the chassis 16. Vertical adjustment is provided by a lever 40 which is pivotally attached to the supporting bracket 38 by a pin 42 and is pivotally attached to the stage supporting member 36 by a pin 44. A screw 46 engages the lever 40. Rotation of a knob 48 attached to the screw 46 causes the screw to be threaded in and out through a nut 50 attached to the cover plate 20, thus pivoting the lever 40 to raise and lower the stage.

A light source assembly, indicated at 52, is mounted in the base section of the housing and is preferably arranged to slide in and out of the side of the housing for cleaning and replacement of a Halogen bulb 54. A concave reflector mirror 56 is mounted behind the bulb, and an aspheric condensing lens 58 is mounted in front of the bulb. Suitable heat and light polarizing filters may be positioned between the bulb 54 and condensing lens 58, as indicated at 60. The mirror 56 and condensing lens 58 direct light from the bulb 54 along a horizontal optical path toward a mirror 62 supported at 45° relative to the base plate 16 by a suitable mounting bracket 64. Light is reflected 90° upwardly through a second condensing lens 66 mounted below the stage support block 28 for directing a condensed cone of light at a specimen mounted on top of the stage 24.

A movable mirror 70 is pivotally supported on a shaft 72 by a backing plate 74. The shaft 72 is journaled for rotation about a horizontal axis within the housing, the shaft 72 projecting through the side wall 18 for attachment to a handle 76. Detent means (not shown) holds the shaft 72 in the position shown in FIG. 2. By moving the lever to the left, as viewed in FIG. 2, the shaft 72 rotates the mirror 70 from the 45° position shown to a position against the bottom plate 16, which permits the light to be reflected by the mirror 62. When in the upper position shown in FIG. 2, the mirror 70 intercepts the light from the condenser lens 58 and reflects it vertically upwardly to a concave mirror 78. The mirror 78 is supported by a mounting bracket 80 within the housing, the mirror 78 being positioned to reflect light at a nominal angle of 20° to 42° toward the top of the stage 24. Thus the mirrors 70 and 78 provide oblique lighting of the specimen from the bulb 54.

The upper housing section 14 includes a platform 82 which is parallel to but spaced above the stage 24. A conventional turret-type multiple objective lens assembly 84 is positioned below and rotatably supported from the platform 82. Rotation of the turret assembly 84 moves one of three objective lenses 86 into axial alignment with the optical axis of the light received through the condensing lens 66 or from oblique light received from the mirror 78.

Positioned within the upper housing section 14, which is made completely light-proof, is a flat mirror 88 mounted on a supporting bracket 90. The mirror reflects the image rays from the objective lens onto a projection lens 92 supported on a mounting bracket 94.

The projection lens 92 projects the enlarged image formed by the objective lens 86 of the hair sample or other specimen being examined onto the surface of a tiltable, flat mirror 96. The mirror is tiltable into either of two positions 96' and 96" about a horizontal axis 98. To this end, the flat mirror 96 is mounted on a backing frame 100 which is pivotally supported on either side along the axis 98 by a pair of supporting brackets 102 extending up from the bottom of the plate 82. The mirror supporting frame 100 is pivotally connected to a control lever 104 which terminates in a pull knob 106 extending outside the front panel of the housing. The control lever is pivotally connected at 108 to the mirror mounting frame 100. With the knob pulled out, in the position shown in FIG. 2, the mirror is rotated to the position 96" in which light extending along the optical axis of the projection lens 92 is reflected upwardly along a vertical path towards the top of the housing. The light so reflected from an image in the focal plane of a film holder 110 mounted on the top of the housing. The holder 110 is preferably of a type for receiving a self-developing film pack such as used in a conventional Polaroid camera. The film holder is preferably provided with a sliding dark shield 112 which must be removed before the film in the holder can be exposed by actuating a shutter 117 to the projected image.

By pushing in on the knob 106, the mirror 96 is rotated to the position 96' in which the light along the optical axis of the projection lens 92 is directed toward an opaque viewing screw 114 mounted in the front panel 116 of the upper section of the housing. The top and sides of the housing provide a hood 118 projecting in front of the panel 116 for partially shielding the face of the viewing screen 114 from ambient light from overhead. The viewing screen 114 may be a ground glass screen or other suitable translucent screen for providing a rear projection image.

What is claimed is:

1. A microscope comprising a housing including a base section and an upper section, a specimen stage mounted on the base section, the stage having an opening, an objective lens mounted on the upper section above the stage, a light source mounted inside the base section, first mirror means directing light from the source along a first path extending through the opening in the stage along the optical axis of the objective lens, second mirror means directing light from the source along a second path extending obliquely onto the top of the stage, movable mirror means for selectively directing the light from said source along either said first path or said second path, a viewing screen mounted on the front of the upper section of the housing, a projection lens mounted on the upper section, optical means directing light from the objective lens through the projection lens, a film holder mounted on top of the upper section of the housing, and tiltable mirror means hingedly supported in the upper section of the housing along the optical axis of the projection lens, the tiltable mirror means in a first position reflecting light from the projection lens along a first path toward the viewing screen, the tiltable mirror means in a second position reflecting light along a second path toward the film holder, and control means extending outside the housing for selectively tilting the mirror means to either position.

2. The apparatus of claim 1 wherein the tiltable mirror means in each of the respective positions is the same optical distance from the viewing screen and film holder.

3. The apparatus of claim 1 further includng means for adjusting the specimen stage toward or away from the objective lens.

4. Apparatus of claim 2 further including means for adjusting the specimen stage toward or away from the objective lens.

5. Apparatus of claim 5 wherein the adjusting means includes means rotatably supporting the stage for rotation about the optical axis of the objective lens.

* * * * *

UNITED STATES PATENT AND TRADEMARK OFFICE
CERTIFICATE OF CORRECTION

PATENT NO. : 4,206,966
DATED : June 10, 1980
INVENTOR(S) : DONALD RAYMOND TYSON et al It is certified that error appears in the above-identified patent and that said Letters Patent are hereby corrected as shown below:

Col. 1, lines 57-58, "sectional view taken substantially on the line 2-2 of FIG. 1" should read -- side elevational view"

Col. 1, line 61, "numberal" should read -- numeral --

Col. 2, line 42, "handle" should read -- lever --

Col. 4, line 37, claim 5, "5" should read -- 3 --

Signed and Sealed this

Twenty-eighth Day of October 1980

[SEAL]

Attest:

SIDNEY A. DIAMOND

Attesting Officer

Commissioner of Patents and Trademarks